(12) United States Patent
Woodman

(10) Patent No.: US 8,150,248 B1
(45) Date of Patent: *Apr. 3, 2012

(54) MOUNT SYSTEM FOR ATTACHING CAMERA TO A SPORT BOARD

(75) Inventor: Nicholas D. Woodman, Sausalito, CA (US)

(73) Assignee: Woodman Labs, Inc., Half Moon Bay, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,369

(22) Filed: Jul. 28, 2011

Related U.S. Application Data

(63) Continuation of application No. 12/498,876, filed on Jul. 7, 2009, now Pat. No. 8,014,656.

(60) Provisional application No. 61/078,743, filed on Jul. 7, 2008.

(51) Int. Cl.
*G03B 17/08* (2006.01)
*G03B 17/00* (2006.01)

(52) U.S. Cl. .......................... 396/25; 396/419

(58) Field of Classification Search .............. 396/25, 396/27, 29, 419, 420, 427, 535; 348/81, 348/143, 373–374; 441/74
See application file for complete search history.

(56) References Cited

U.S. PATENT DOCUMENTS

| | | | |
|---|---|---|---|
| 6,315,180 B1 * | 11/2001 | Watkins | 224/275 |
| 6,955,484 B2 | 10/2005 | Woodman | |
| 8,014,656 B2 * | 9/2011 | Woodman | 396/25 |
| 2007/0242134 A1 * | 10/2007 | Zernov | 348/81 |

* cited by examiner

*Primary Examiner* — W. B. Perkey
*Assistant Examiner* — Minh Phan
(74) *Attorney, Agent, or Firm* — Fenwick & West LLP

(57) ABSTRACT

A camera mount is configured to attach a camera to a sports board. A camera is secured to the mount, which is secured to a sports board. The mount can secure to the sports board via an attachment device such as an embedded plug. The mount can be placed at the front or rear of the sports board. Furthermore, the mount can be configured to face either forwards or backwards to capture images and/or video from different viewpoints while participating in the board activity. Moreover, the mount includes a pivoting joint to allow a user to rotate the camera either upward or downward and then secure the camera at a fixed angle to capture images and/or video from different angles.

21 Claims, 17 Drawing Sheets

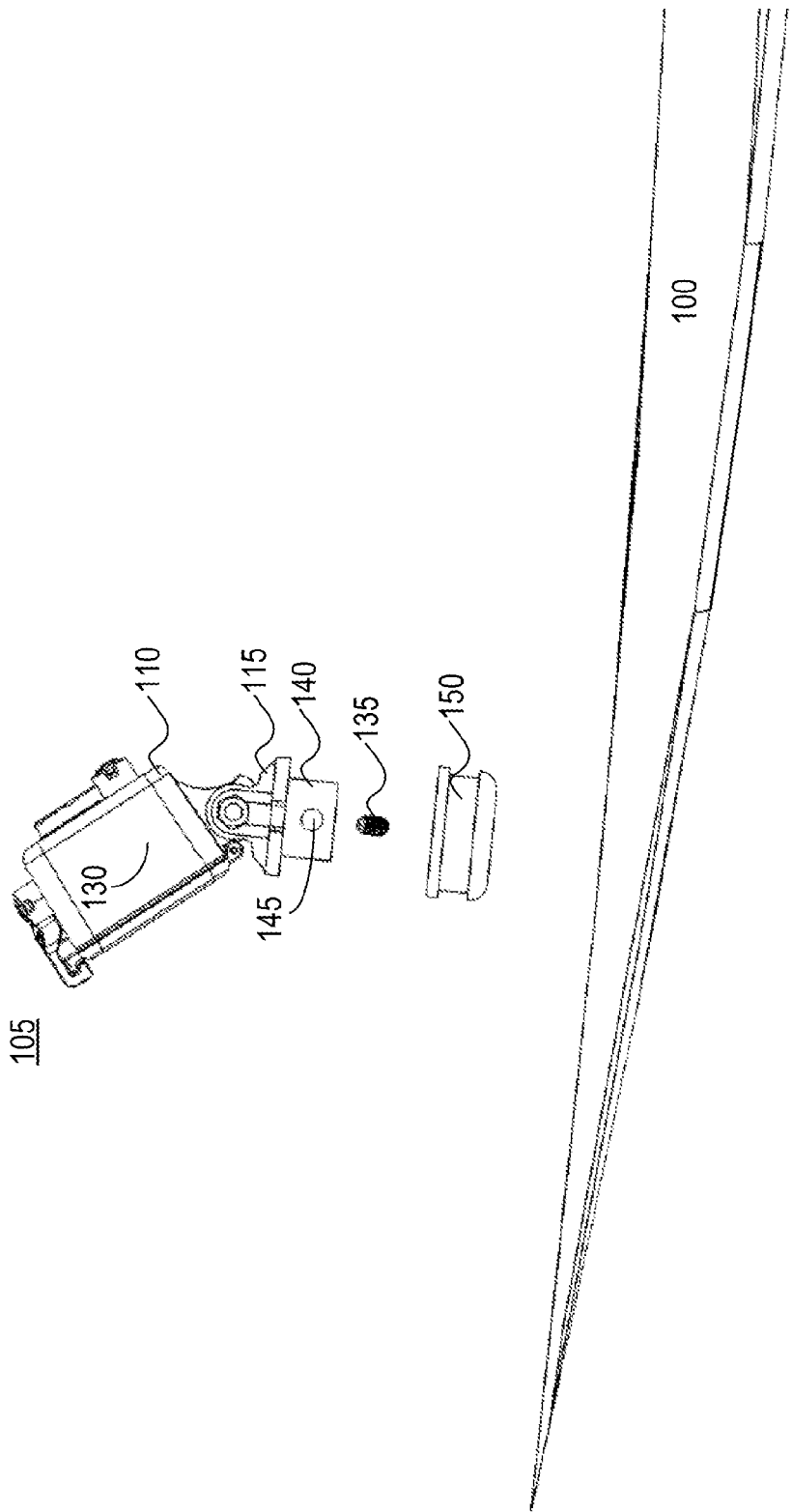

US 8,150,248 B1

MOUNT SYSTEM FOR ATTACHING CAMERA TO A SPORT BOARD

RELATED APPLICATIONS

This application is a continuation of U.S. patent application Ser. No. 12/498,876, filed on Jul. 7, 2009 entitled "Mount System for Attaching to a Sports Board" which application claims a benefit of, and priority to, U.S. Provisional Patent Application No. 61/078,743, entitled "Mount System for Attaching to a Sports Board" filed on Jul. 7, 2008, the contents of which are hereby incorporated by reference.

BACKGROUND

1. Technical Field

The disclosed embodiments relate to mechanisms for securing a device, for example a camera, and more specifically, to a mount system for attaching the device to a sport board for use during periods of sport activity.

2. Description of the Related Arts

The problem of conveniently carrying, accessing, and using a camera under various operating conditions has existed since the beginning of hand-held photography. With the spread of digital photography, which allows inexpensive photograph storage and capture, more individuals are exposed to the inherent limitations that camera securement imposes during periods of activity. Fast-paced and strenuous physical activities such as surfing, jogging, mountain climbing, snowboarding, and skydiving often require the individual to fully concentrate on the activity rather than on capturing photographs or video. Furthermore, such activities often leave the participant without a free hand to operate the camera.

Board sports, such as surfing, in particular are subject to restraints of the ability to photograph or video an activity mid-action. The fast-paced nature of surfing narrows the window of time for taking an ideal photograph or video considerably, often down to a few seconds or less. Further, even if a surfer was able to photograph or video the activity, the surfer might fall or be pulled off the surfboard, which could make it difficult for the surfer to hold on to the camera. This risks damage to the camera, or losing the camera altogether, and further imposes risks on the surfer who may need the use of free hands to ensure his or her safety.

Another problem with taking photographs or video during surfing is the challenge of stowing the camera after a photograph has been taken. For example, a surfing photographer taking a photograph of a breaking wave might quickly need his or her hands free to push their surfboard under the wave after taking the photograph. The surfer may not have enough time to securely store the camera after taking a photograph. Additionally, the surfer might just prefer to have the camera immediately out of the way so that he or she can catch a wave without the hassle of stowing their camera.

In view of the challenges above, surfers often do not attempt to capture such photographs or videos themselves and instead rely on others to do so. However, positioning a photographer in close proximity to a surfer creates a dangerous situation for both the photographer and the surfer. Further, the photographer may have an extremely limited amount of time to capture the photograph before the wave passes over him or her.

Similar problems exist in other boarding sports such as windsurfing and wakeboarding. In each instance, the fast paced activity makes close action photography different and potentially dangerous.

BRIEF DESCRIPTIONS OF THE DRAWINGS

The disclosed embodiments have other advantages and features which will be more readily apparent from the following detailed description and the appended claims, when taken in conjunction with the accompanying drawings, in which:

FIG. (or "FIG.") 1a illustrates one embodiment of a lateral view of a camera mount attached to the front of a surfboard with the camera mount facing forwards.

FIG. 4b illustrates one embodiment of a close lateral view of a camera mount unattached from the front of a surfboard with the camera mount facing backwards, and with the surfboard attachment device removed from the front of the surfboard.

DETAILED DESCRIPTION

Figure 1A:
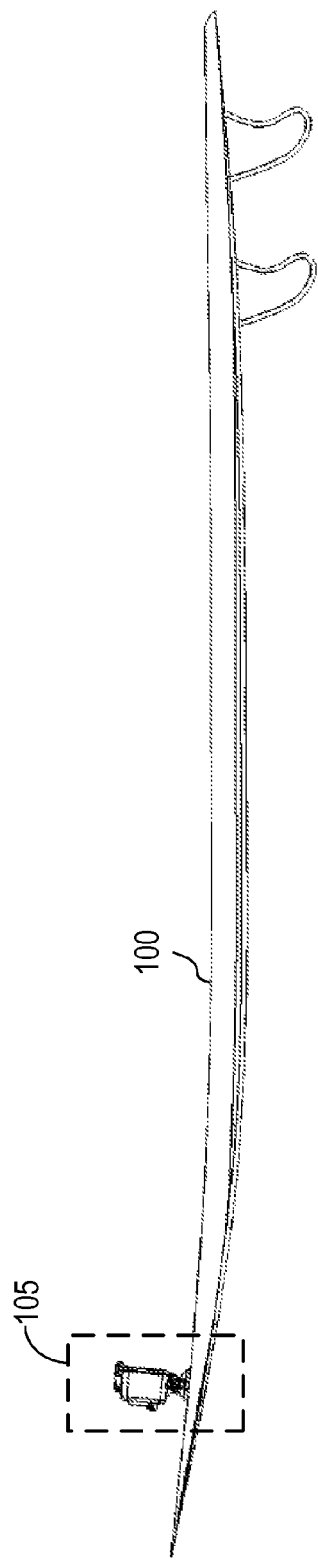
FIG. 1b illustrates one embodiment of a lateral view of a camera mount attached to the front of a surfboard with the camera mount facing backwards.
FIG. 1c illustrates one embodiment of a lateral view of a camera mount attached to the rear of a surfboard with the camera mount facing forwards.

The disclosed embodiments include a mount for attaching a camera to a sporting board, for example a surfboard, windsurfing board, kite surfing board, skateboard, snowboard, skis, or a wakeboard. For ease of description, references will be made to a surfboard, but the principles described herein are understood to be applicable to other sporting boards.

Overview

In one embodiment, the mount comprises an upper mount component and a lower mount component. The upper mount component secures a camera. The lower mount component is securely coupled to the upper mount component and is configured to secure to a surfboard.

In various embodiments, the camera mount can be placed on the front of the surfboard or the rear of the surfboard. Furthermore, the mount can be configured to face either forwards or backwards to capture images and/or video from different viewpoints while surfing. Moreover, the mount can include a pivoting joint to allow a user to rotate the camera either upward or downward and then secure the camera at a fixed angle to capture images and/or video from different angles. Beneficially, the camera mount allows a user to securely, safely, and easily carry a camera while surfing in a manner which does not handicap the user's participation in surfing.

In one embodiment, the upper mount component securely encloses the camera, and includes two or more protrusions, each containing a hole (e.g. a pin hole), extending from the bottom surface of the upper mount component. The lower mount component also includes two or more protrusions, each containing a pin hole, extending from the upper surface of the lower mount component. The protrusions of the two mount components interlock, such that the pin holes align, and a pin can pass through them, securing the upper mount component to the lower mount component. In one embodiment, the pin is a turnable handscrew, which allows the upper mount component to rotate around the lower mount component when loosened, and secures the upper mount component to the lower mount component at a fixed angle when tightened. In other embodiments, the pin is a threaded screw, a rod, a clip, or other similar device. In one embodiment, the lower mount component contains a securing protrusion with a hole, extending from the bottom surface of the lower mount component, which can be inserted into a reciprocal opening on a surfboard and secured with a securing pin. When the lower mount component's bottom protrusion is fully inserted into the reciprocal opening, the remainder of the surface of the bottom surface of the lower mount component is substantially flush with the top surface of the surfboard.

In one embodiment, the camera housing may include a front face, a top face, a bottom face, a left face and a right face, as well as a back door, which can be opened and closed around a hinge connecting the bottom of the door to the housing, allowing a camera to be inserted and removed from the housing, and which can be securely closed by a fastening structure at the top of the back door and housing. In one embodiment, the housing is waterproof when the back door is secured in the closed position.

In another embodiment, an embedded plug is fixed into a reciprocal cavity in the surfboard, and includes a reciprocal opening for the securing protrusion of the lower mount component and an additional hole positioned such that when the lower mount component's securing protrusion is inserted into the reciprocal opening of the embedded plug, the embedded plug's hole is substantially aligned with the hole of the securing protrusion to allow a securing device to secure the lower mount component to the surfboard.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Example Configurations

In one embodiment a camera mount can be attached to the surfboard via a variety of securing mechanisms such as an embedded surfboard plug or other securing mechanism. In various configurations, the camera can be mounted to either the front or back of the top of the surfboard. Further still, various embodiments allow for the camera to face either forward or backward on the surfboard to capture images and/or video from different viewing angles.

Figure 1B:
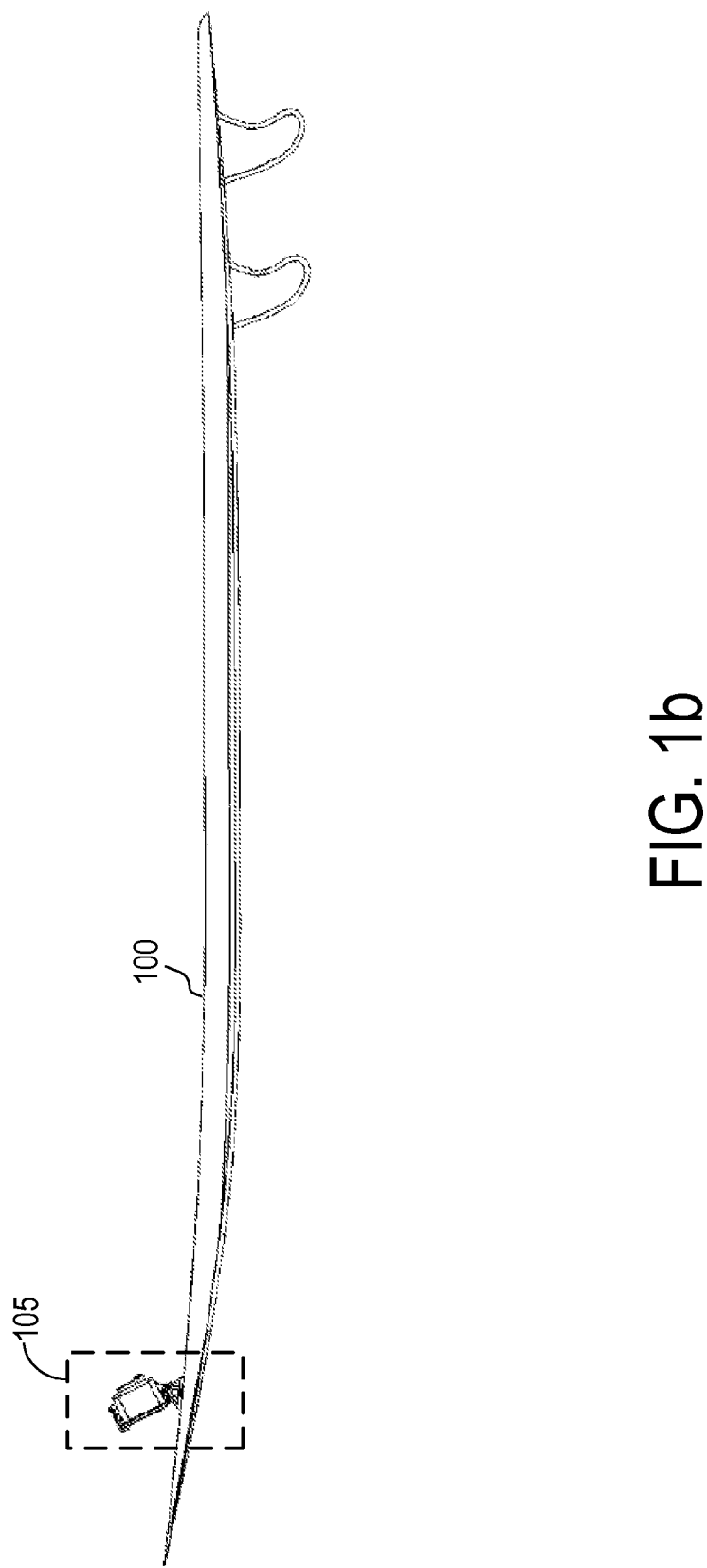

FIGS. (or "FIGS.") 1a-c illustrate embodiments of a camera mount 105 attached to a surfboard 100. In the configuration of FIG. 1a, the camera mount 105 is mounted to the front of the surfboard 100 and faces forwards. The camera is configured to capture video and/or images while surfing but without requiring the use of the surfer's hands. In one embodiment, the camera mount 105 is bidirectional and can be attached to the surfboard 100 facing in either direction. For example, FIG. 1b is a lateral view of the camera mount 105 attached to the front of the surfboard 100 facing backwards. This configuration is useful for capturing frontal images or videos of a surfer positioned on the surfboard 100.

Figure 1C:
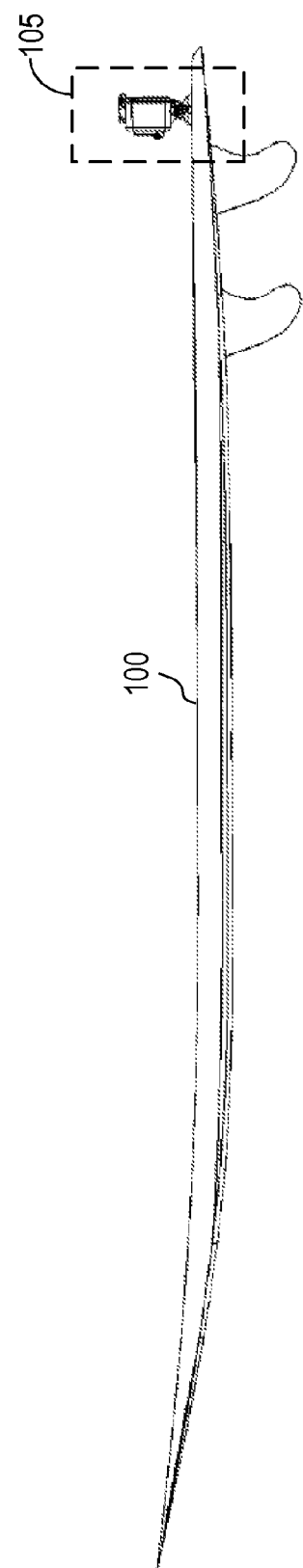

In another alternative embodiment, the camera mount 105 can be attached to the rear of the surfboard 100 instead of to the front of the surfboard 100. For example, FIG. 1c illustrates one embodiment of a lateral view of a mount 105 attached to the rear of the surfboard 100, facing forwards. This view can capture the surfer from behind and also provide views similar to those seen in front of the surfer. In yet another alternative embodiment (not shown), the camera mount 105 can be configured to mount on the back of the surfboard 100 and face backwards in order to capture yet additional views.

Figure 2A:
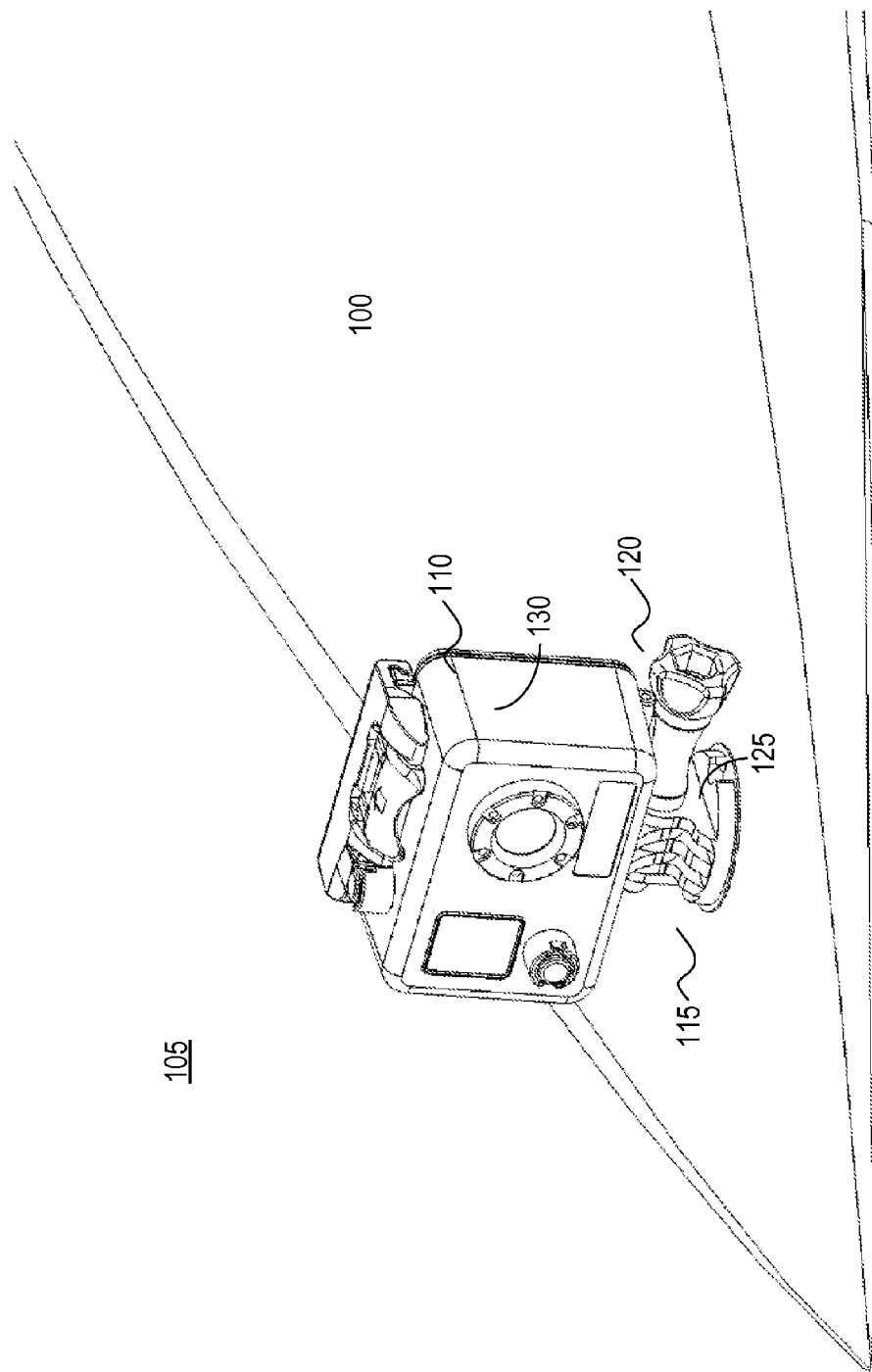
FIG. 2a illustrates one embodiment of a perspective view of a camera mount attached to the front of a surfboard with the camera mount facing forwards.
Figure 2B:
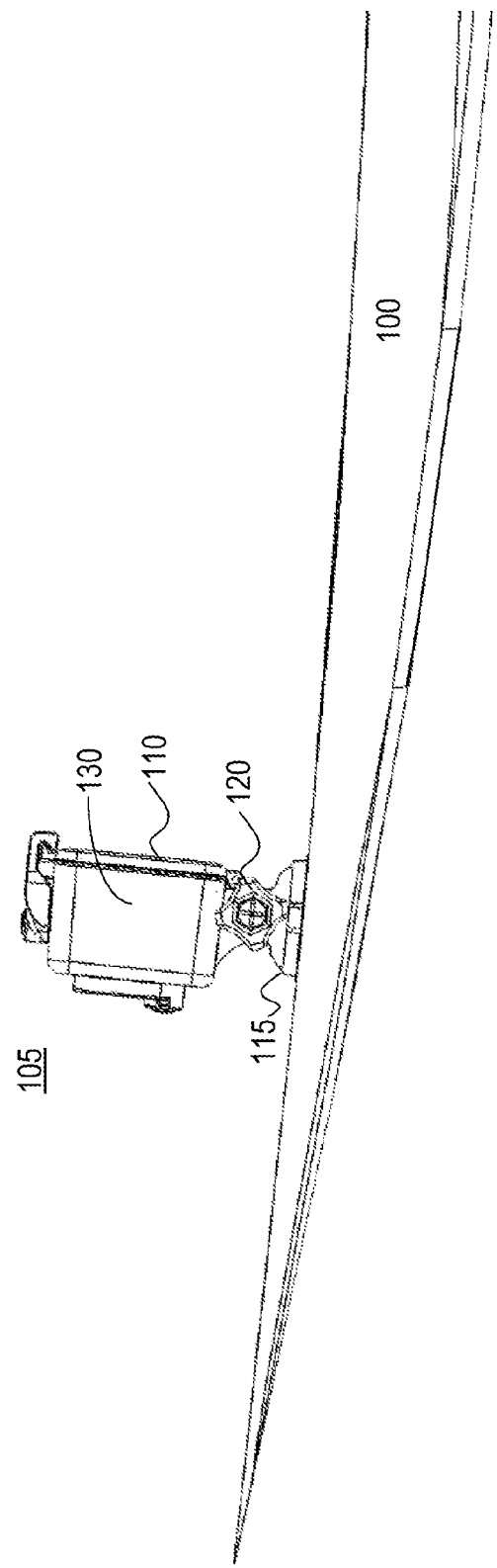
FIG. 2b illustrates one embodiment of a lateral view of a camera mount attached to the front of a surfboard with the camera mount facing forwards.
Figure 2C:
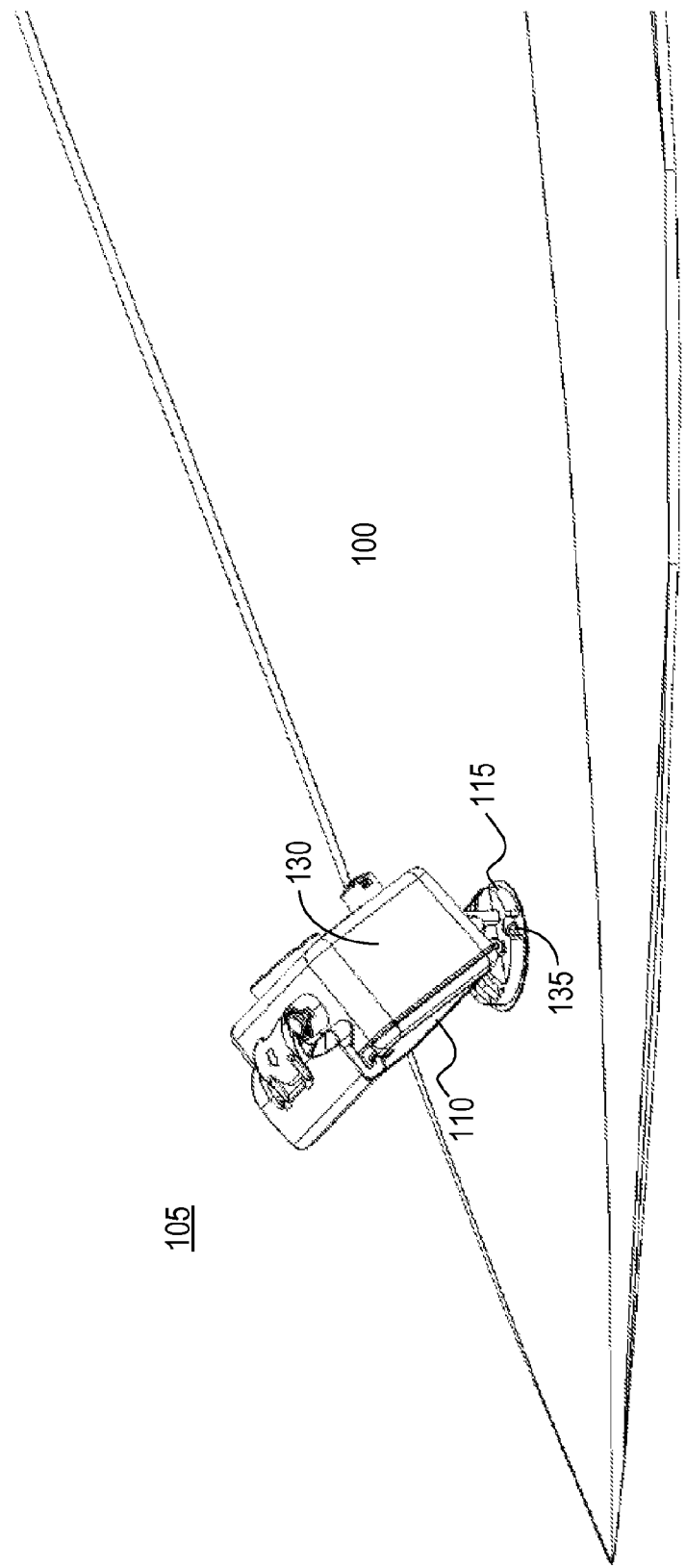
FIG. 2c illustrates one embodiment of a perspective view of a camera mount attached to the front of a surfboard with the camera mount facing backwards.
Figure 2D:
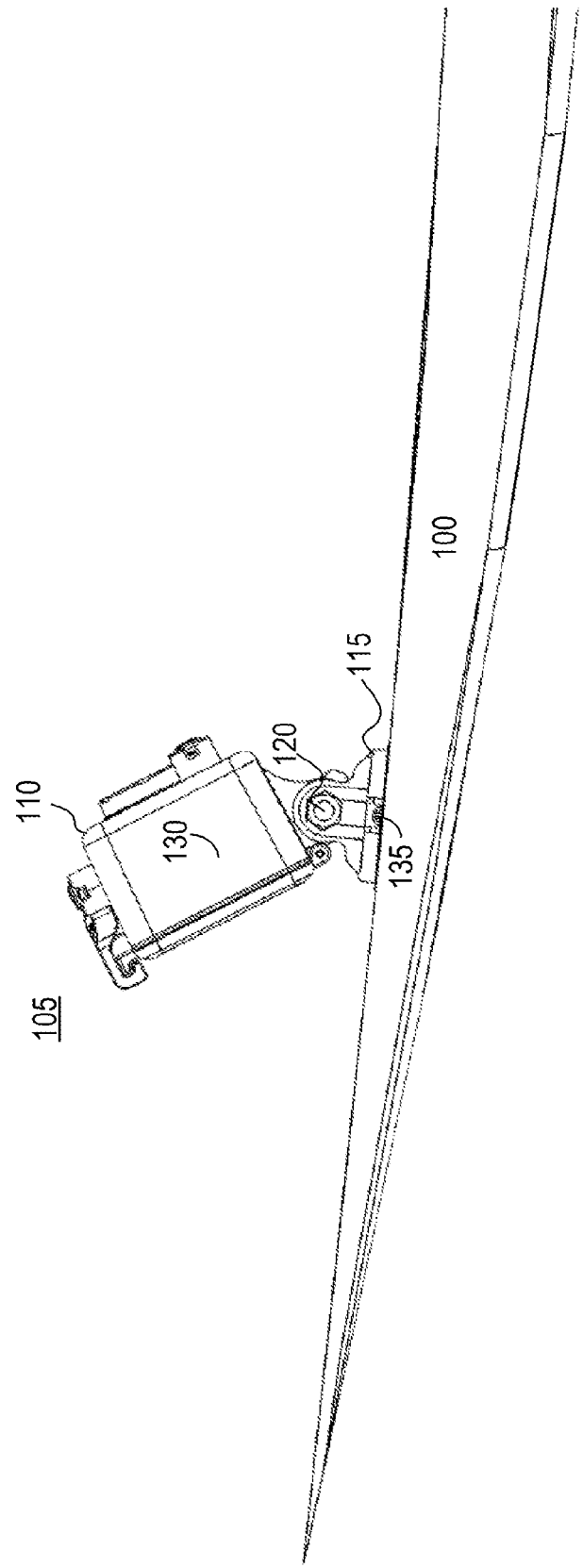
FIG. 2d illustrates one embodiment of a lateral view of a camera mount attached to the front of a surfboard with the camera mount facing backwards.
Figure 2E:
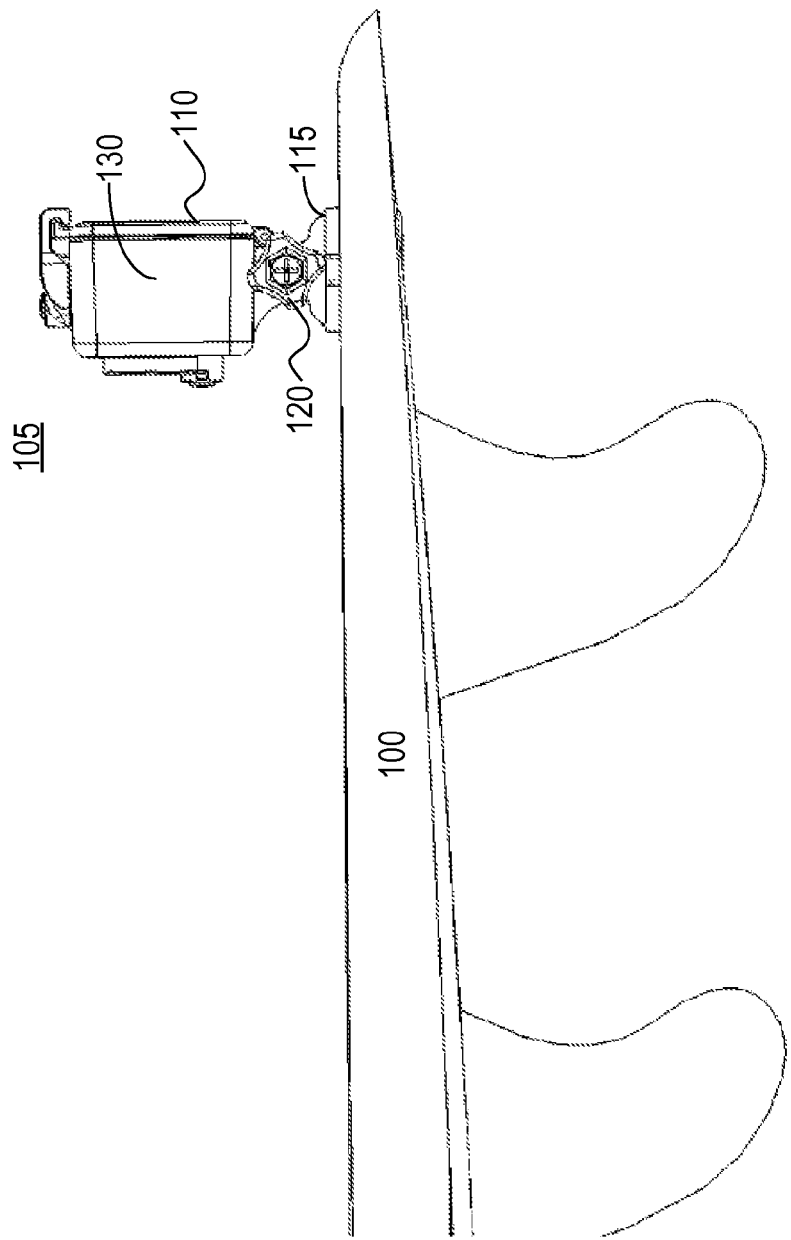
FIG. 2e illustrates one embodiment of a lateral view of a camera mount attached to the rear of a surfboard with the camera mount facing forwards.
Figure 2F:
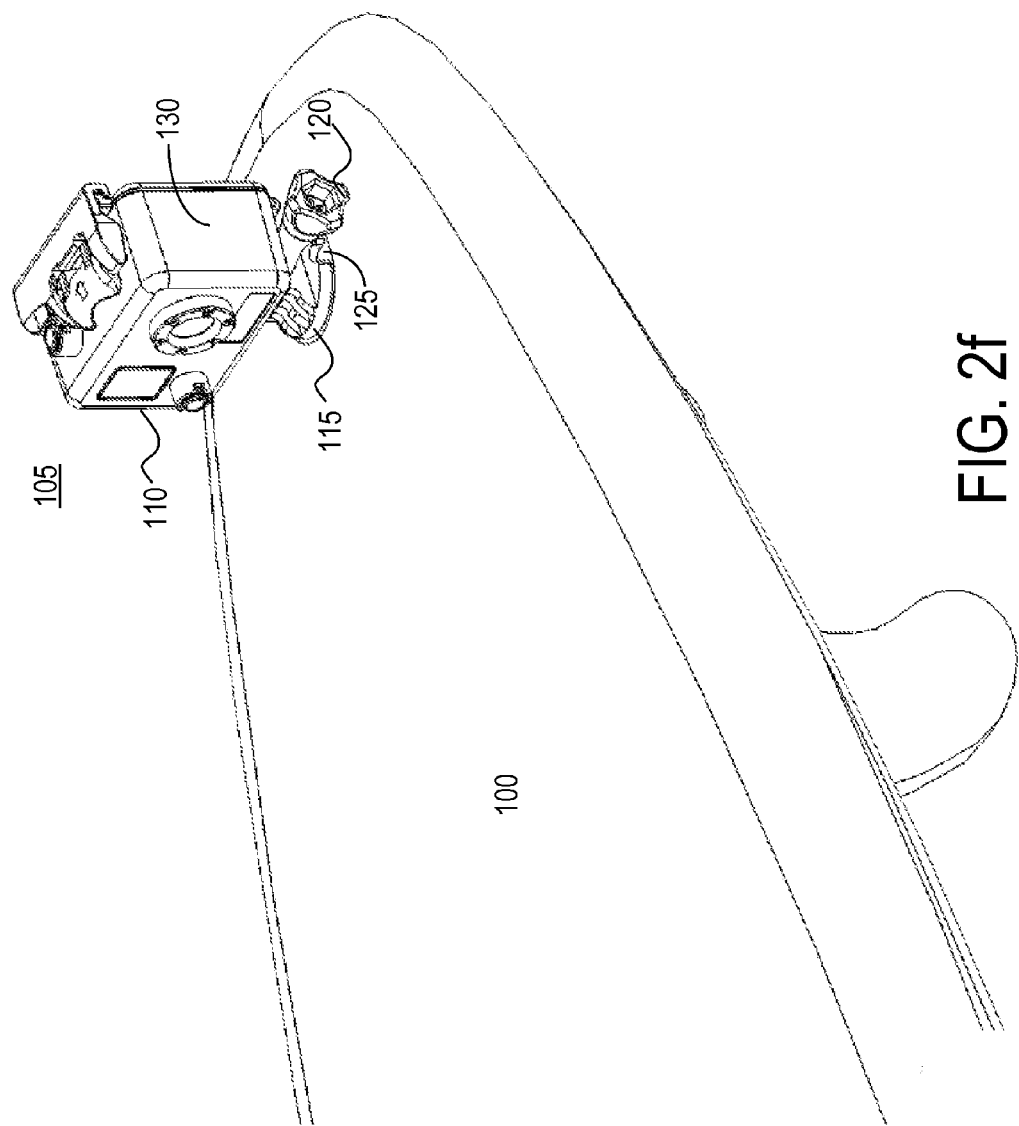
FIG. 2f illustrates one embodiment of a perspective view of a camera mount attached to the rear of a surfboard with the camera mount facing forwards.
Figure 3A:
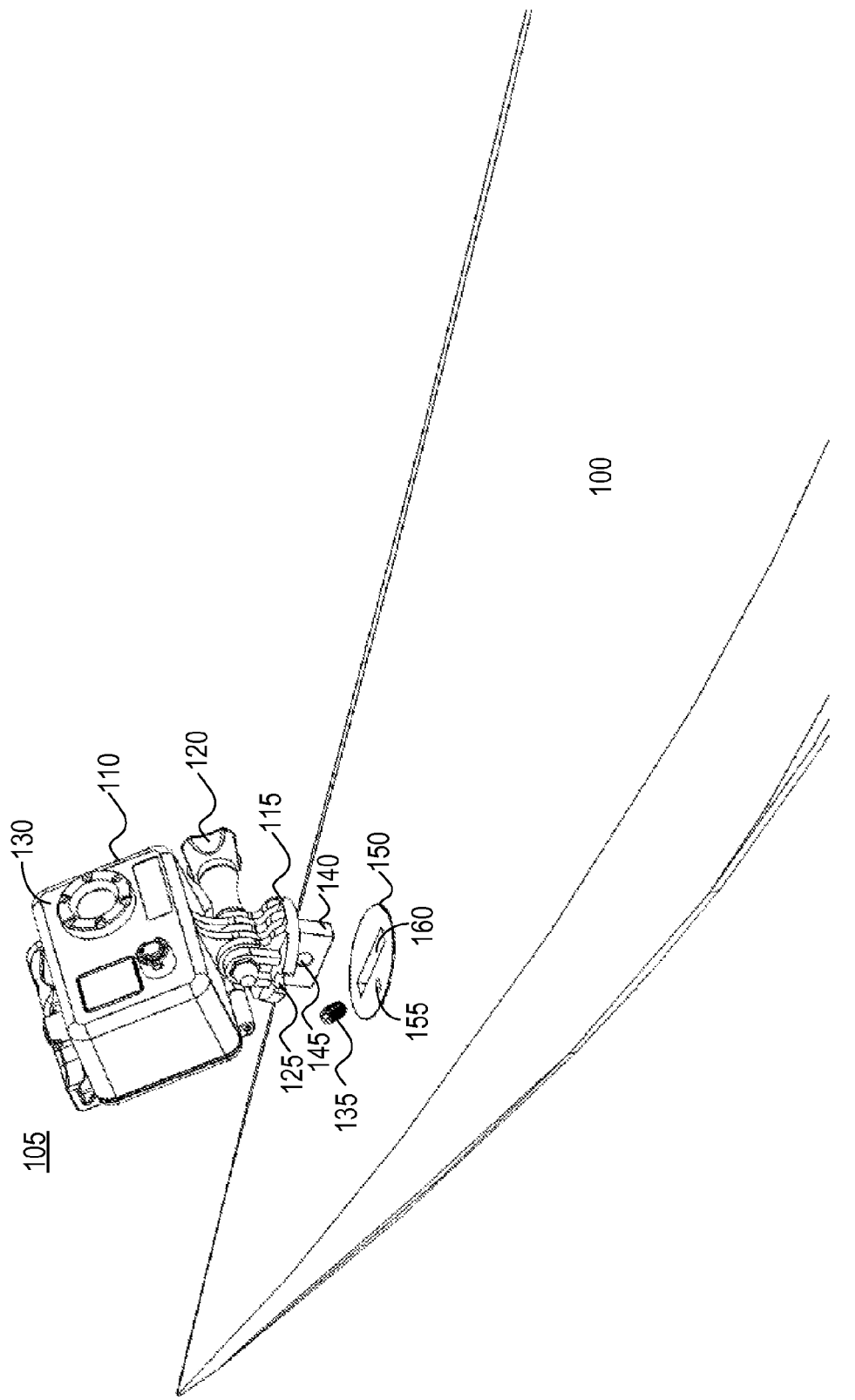
FIG. 3a illustrates one embodiment of a perspective view of a camera mount unattached from the front of a surfboard with the camera mount facing backwards.
Figure 3B:
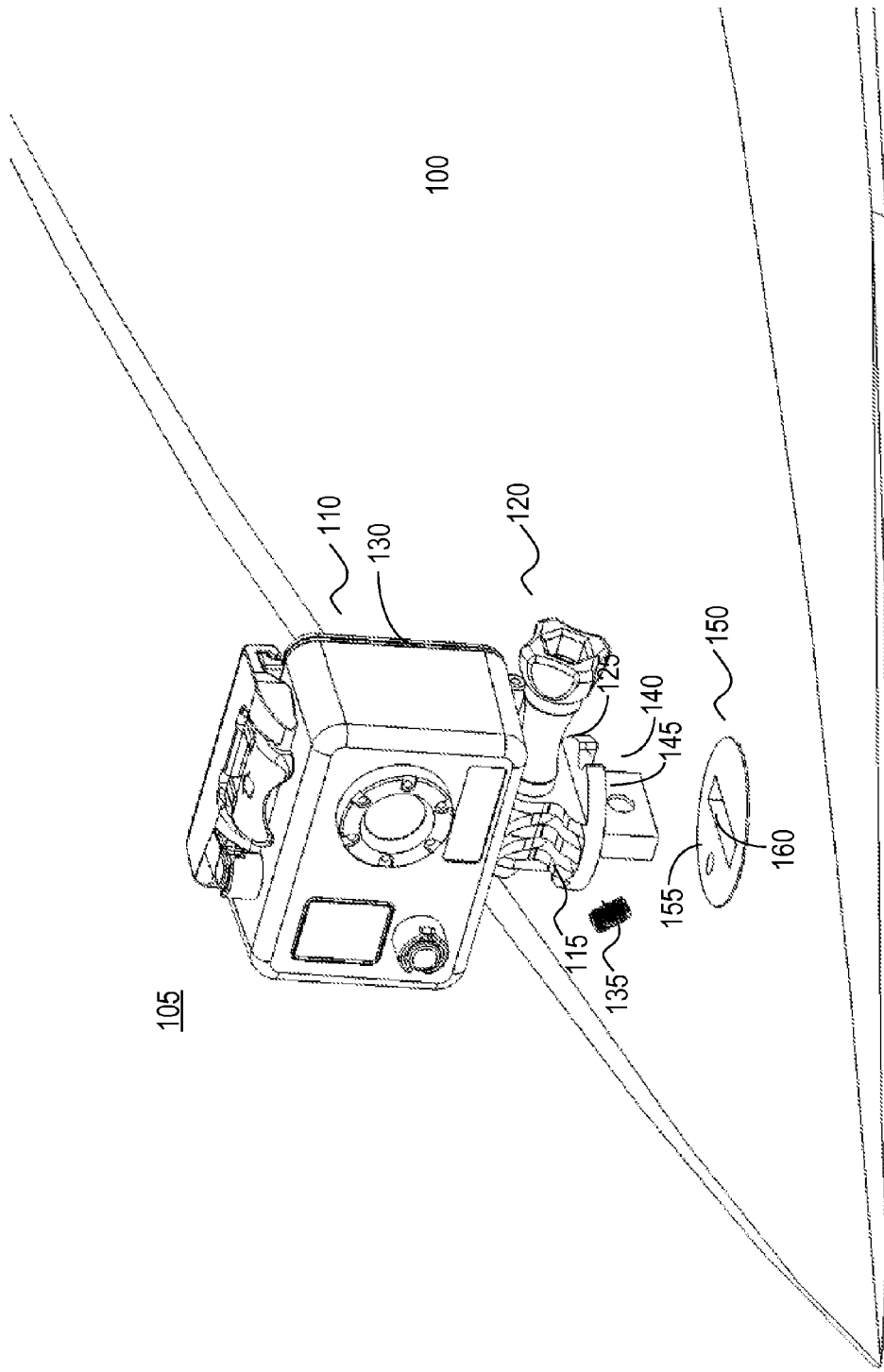
FIG. 3b illustrates one embodiment of a perspective view of a camera mount unattached from the front of a surfboard with the camera mount facing forwards.
Figure 3C:
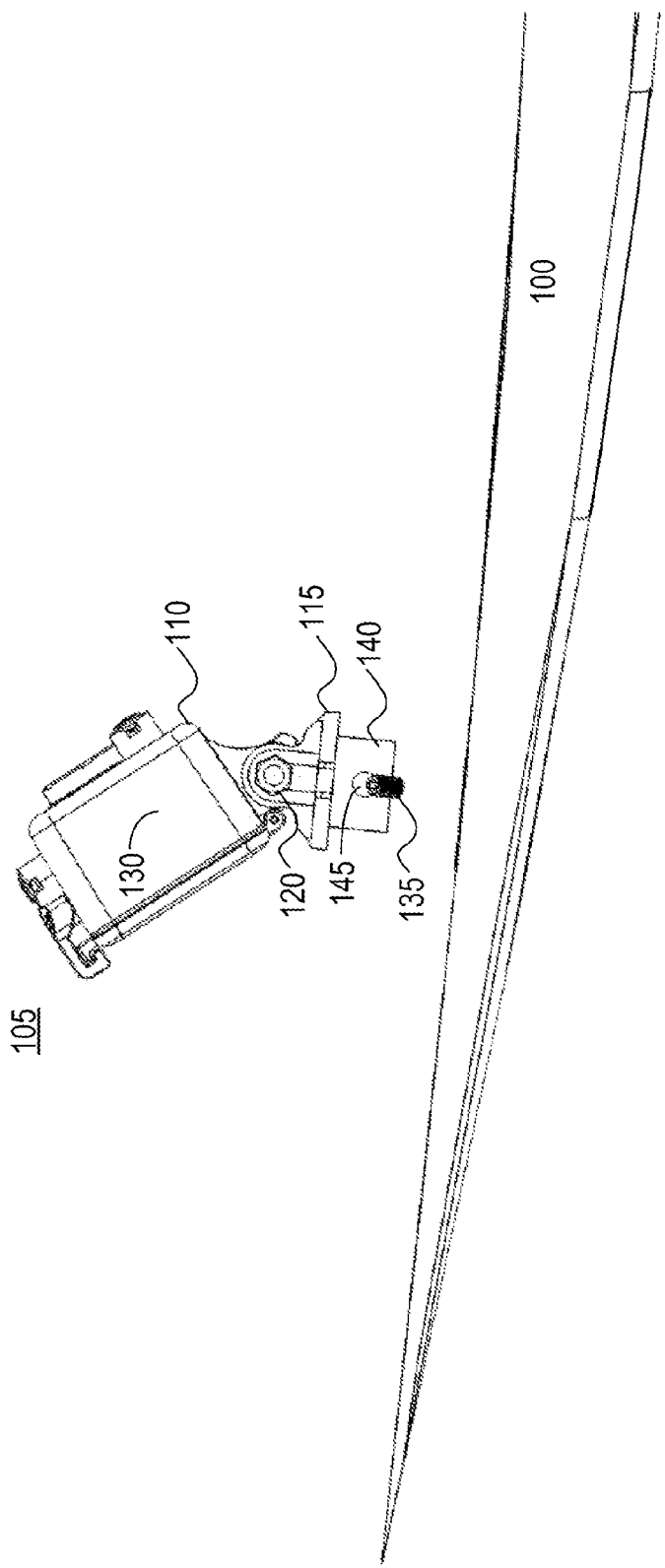
FIG. 3c illustrates one embodiment of a lateral view of a camera mount unattached from the front of a surfboard with the camera mount facing backwards.
Figure 3D:
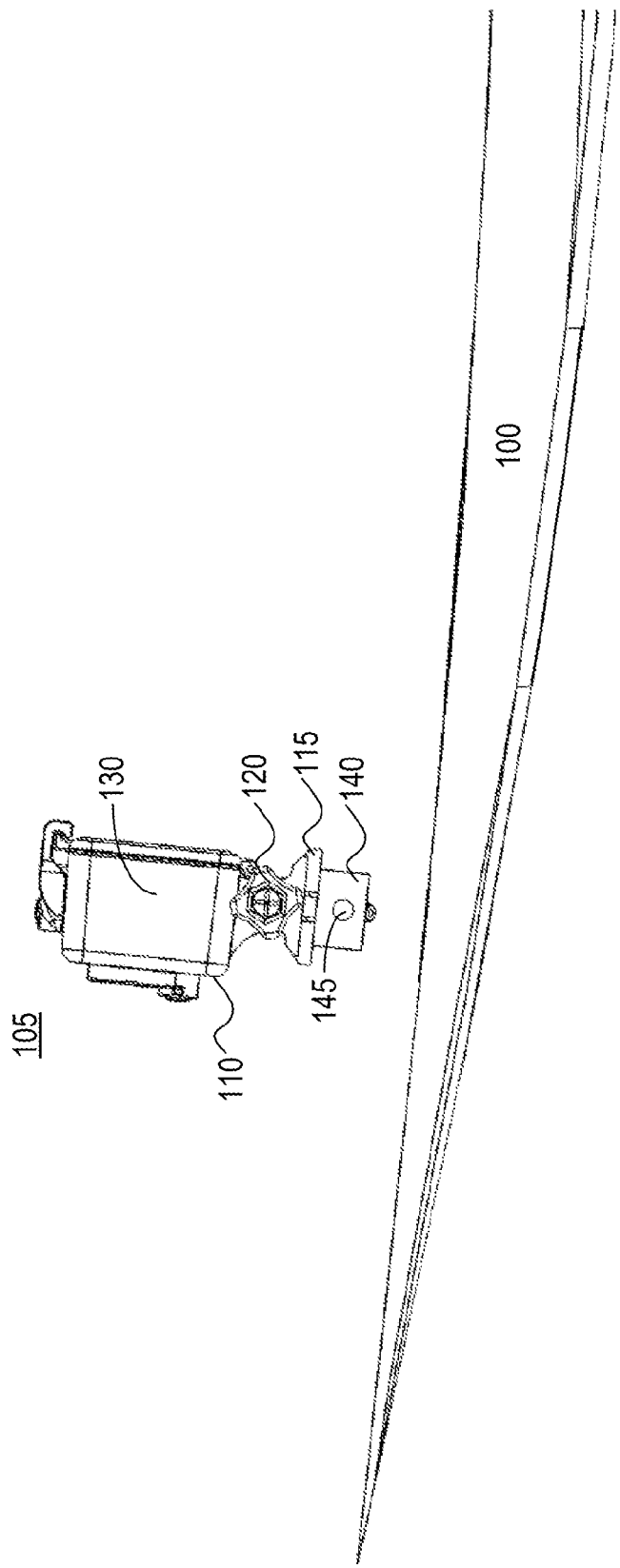
FIG. 3d illustrates one embodiment of a lateral view of a camera mount unattached from the front of a surfboard with the camera mount facing forwards.
Figure 3E:
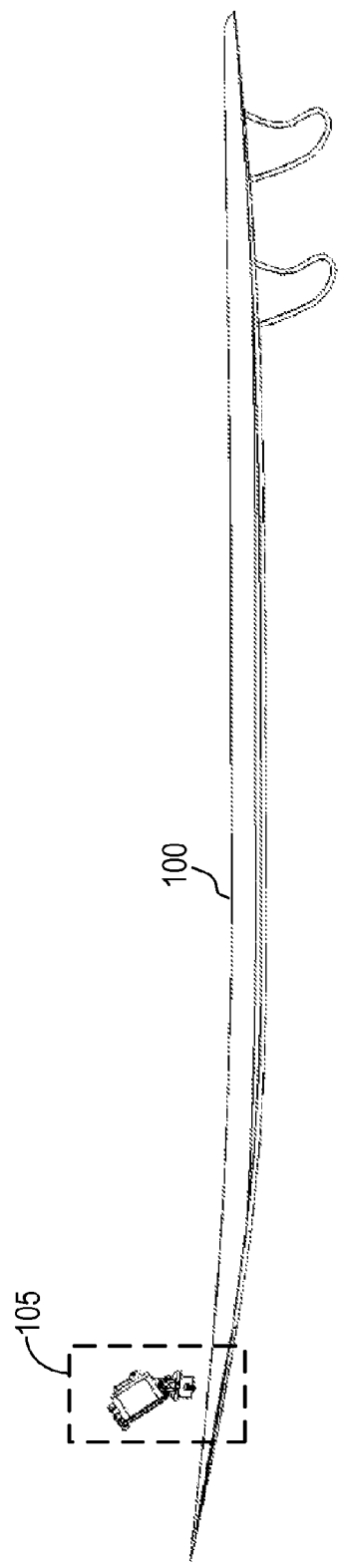
FIG. 3e illustrates one embodiment of a distant lateral view of a camera mount unattached from the front of a surfboard with the camera mount facing backwards.

FIG. 2a provides a closer perspective view of the mount 105 attached to the surfboard 100. FIGS. 2b-2f provide various alternative views of the mount 105 attached to the surfboard 100. In the various illustrated embodiments of FIGS. 2a-f, the mount 105 can face either forwards or backwards on the surfboard 100 and can be mounted on either the front or back portions of the surfboard 100. The mount 105 comprises an upper mount component 110 and a lower mount component 115. The upper mount component 110 is pivotally coupled to the lower mount component 115 to form a pivot assembly, as further described below. The lower mount component 115 secures to the surfboard 100. For example, in one embodiment, the lower mount component 115 secures to the surfboard 100 using a securing mechanism (e.g. a screw, pin, rod, or other suitable device) that passes through a slot 125 (e.g., a semi-circle hole) on the lower mount component 115. In various embodiments, the lower mount component 115 can be coupled to an embedded surfboard plug or other type of attachment device that is fixed to the surfboard 100. Examples of attachment devices for securing a camera mount 105 to a surfboard 100 will be described in more detail below with respect to FIGS. 3a-e and 4a-c.

In one embodiment, the upper mount component 110 includes a camera housing that secures and houses a camera 130. In one embodiment, the camera 130 is removeable from the housing. Alternatively, the described housing may be incorporated into the body of the camera as a waterproof camera that is directly attachable to the mount 100. The camera housing may comprise a rigid (or substantially rigid) waterproof enclosure. For example, the camera housing may be constructed from plastic, metal, fiberglass, etc. In one embodiment, the camera housing may include a front face, a top face, a bottom face, a left face and a right face, as well as a back door. The back door pivots around a hinge on the bottom edge of the housing. A first fastening structure on the top face of the camera housing detachably couples a second fastening structure on the door such that the door is secured to the housing in a closed position when coupled and is secured in an open position when uncoupled. In an alternative embodiment, the upper mount component 110 secures the camera 130 using a different securing mechanism in place of the housing 130. For example, the upper mount component 110 may include elastic coupling bands that secure around the body of the camera 130. In yet other alternative embodiments, the upper mount component 110 is configured to couple directly to the body of a waterproof camera 130 instead of being enclosed in a separate camera housing. In this embodiment, the camera 130 may attach to the mount 105 using, for example, a button assembly, a buckle assembly, a clip assembly, a hook and loop assembly, a magnet assembly, a ball and catch assembly, and an adhesive assembly, or any other type of securing mechanism. Examples of such configurations are in U.S. Pat. No. 6,955,484 entitled "Harness System for Attaching Camera to User" to Nicholas Woodman, the content of which is incorporated by reference herein in its entirety.

The camera 130 can be a conventional camera and can be configured to capture still images, video, or both. In one embodiment, the camera 130 includes a wireless interface that allows a surfer to operate the camera remotely using, for example, a remote control device.

The upper mount component 110 and the lower mount component 115 are secured together such that the upper mount component 110 can pivot relative to the lower mount component 115. For example, in the embodiment of FIG. 2a-f, the upper mount component 110 and the lower mount component 115 are secured by a hand screw 120. When the hand screw 120 is loosened, the upper mount component 115 can freely pivot around the hand screw 120. When the hand screw 120 is tightened, the upper component 110 is secured at a fixed angle relative to the lower mount component 115. Thus, a user can loosen the handscrew 120 to pivot the upper component 115 to position the camera lens at a desired angle relative to the surfboard 100, and then tighten the handscrew 120 to secure the camera with the lower mount component 115 at the desired angle.

In one embodiment, the upper mount component 110 and lower mount component 115 each include vertical protrusions spaced apart such that the upper and lower protrusions interlock. For example, in the illustrated embodiment, the bottom of the upper mount component 110 comprises two vertical protrusions with a gap between them. The top of the lower mount component 115 comprises three vertical protrusions, with two gaps of similar size between the first and second protrusion and between the second and third protrusion. Each protrusion has a hole of similar size and is positioned such that the holes are horizontally aligned when the upper mount component 110 and lower mount component 115 are interlocked. The hand screw 120 passes through the holes to secure the upper mount component 115 and lower mount component 110 together.

In another alternative embodiment, a configuration allows the user to pivot the camera 130 about the pivot assembly and capture images and/or video from a desired angle. In yet other alternative embodiments, the upper mount component 110 and lower mount component 115 comprise a single rigid component that does not necessarily include a pivoting joint.

FIGS. 3a-e illustrate an embodiment of various views of the mount 105 unattached from the surfboard 100 with the mount facing either forwards or backwards relative to the surfboard 100. These views illustrate an example of a securing mechanism for securing the camera mount 105 to the surfboard 100. In one embodiment as illustrated, the lower mount component 115 is secured to the surfboard 100 by a screw 135 (e.g., an Allen screw) which passes through hole 125. In alternate embodiments, the lower mount component 115 attaches to the surfboard 100 by a different securing mechanism. For example, the mount 105 may be secured to the surfboard 100 using various types of buttons, buckles, clips, magnets, adhesives, and so on.

The lower mount component 115 attaches to a surfboard attachment device fixed to the surfboard 100. The surfboard attachment device may comprise, for example, an embedded plug 150 as illustrated in FIGS. 3a-e and 4a-c and described in further detail below. In yet other alternative embodiments, the surfboard attachment device may comprise a different type of plug or attachment system.

In one embodiment, the surfboard attachment device for attaching the mount 105 to the surfboard 100 comprises an attachment plug that is configured for attaching to a surfboard. To use the mount 105, a surfer may install the attachment plug at a desired location on the top of the surfboard.

In the embodiment of FIGS. 3a-e, the camera mount 105 is configured to securely couple to an embedded surfboard plug 150 fixedly embedded in the surfboard 100. In this embodiment, the lower mount component 115 comprises a round base plate with a slot 125 cut out of each side, the diameter of the screw 135. The bottom of the lower mount component 115 comprises a protrusion 140 (e.g. a rectangular-shaped protrusion) with a screw hole 145.

The embedded plug 150 may be a custom configured embedded plug, or may be an embedded attachment plug installed on the top side of the surfboard 100. In one embodiment, the embedded plug 150 comprises a vertical slot 160 of similar proportions to the protrusion 140 on the bottom of the lower mount component 110. The embedded plug 150 further comprises a hole 155 drilled diagonally downwards and towards the center of the surfboard 100. The protrusion 140 on the bottom of the lower mount component 115 fits into the vertical slot 160 in the embedded plug 150 so that the base plate of the mount 105 lies flat on the surfboard 100. To secure the camera mount 105 to the surfboard 100, the screw 135 is inserted downward into the hole 155 and through the hole 145 of the lower mount component 115 when the lower mount component 115 is inserted into the slot 160 of the embedded plug 150, securing the lower mount component 115 to the surfboard 100. Those of ordinary skill in the art will recognize that other methods of attaching the embedded plug 150 to the sports board 100 are possible besides using a screw 135 such as e.g., an adhesive securing mechanism, bolt assembly, a button assembly, a buckle assembly, a clip assembly, a hook and loop assembly, a magnet assembly, a ball and catch assembly, or any other type of securing mechanism.

Figure 4A:
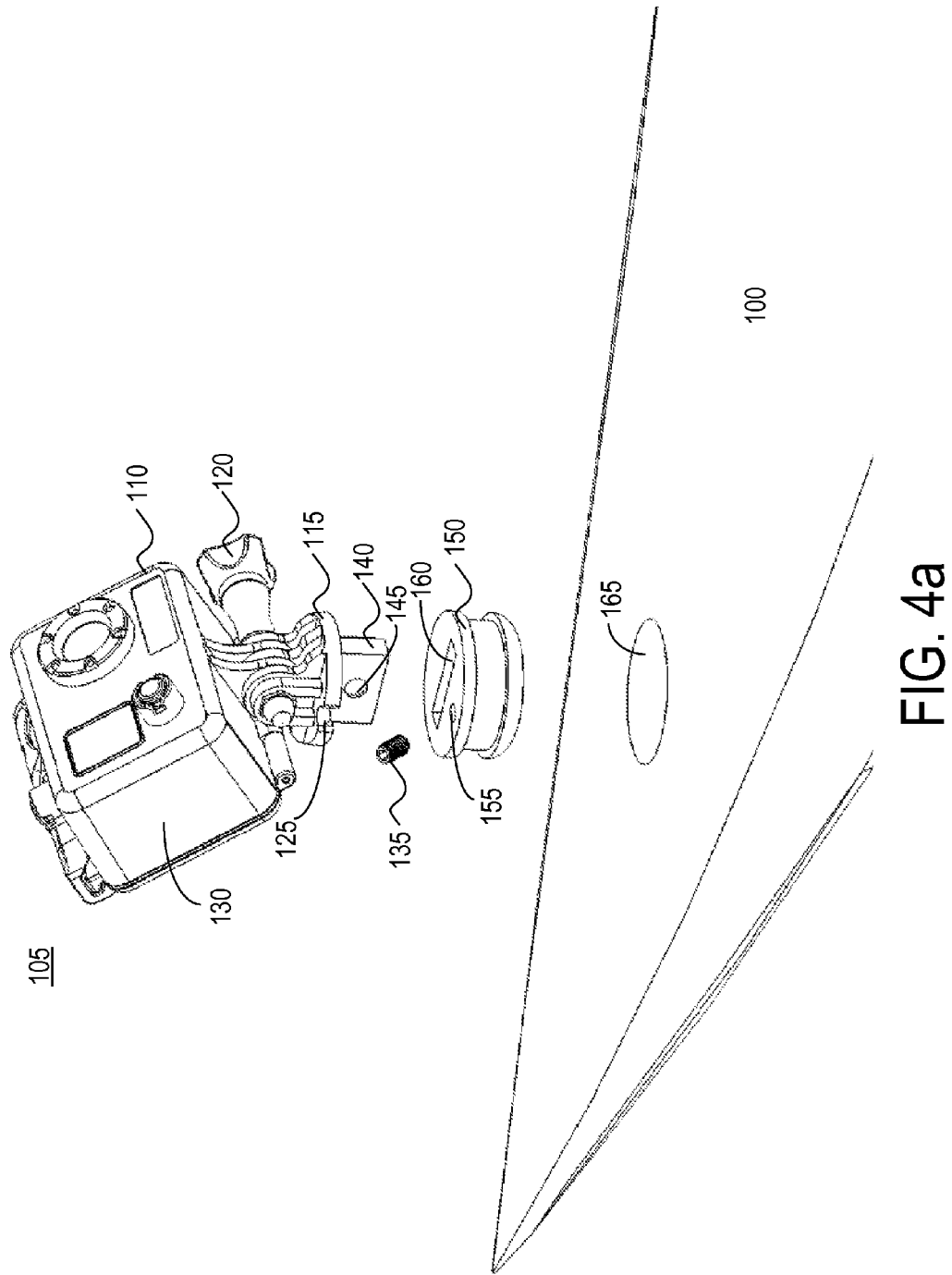
FIG. 4a illustrates one embodiment of a perspective view of a camera mount unattached from the front of a surfboard with the camera mount facing backwards, and with a surfboard attachment device removed from the front of the surfboard.
Figure 4C:
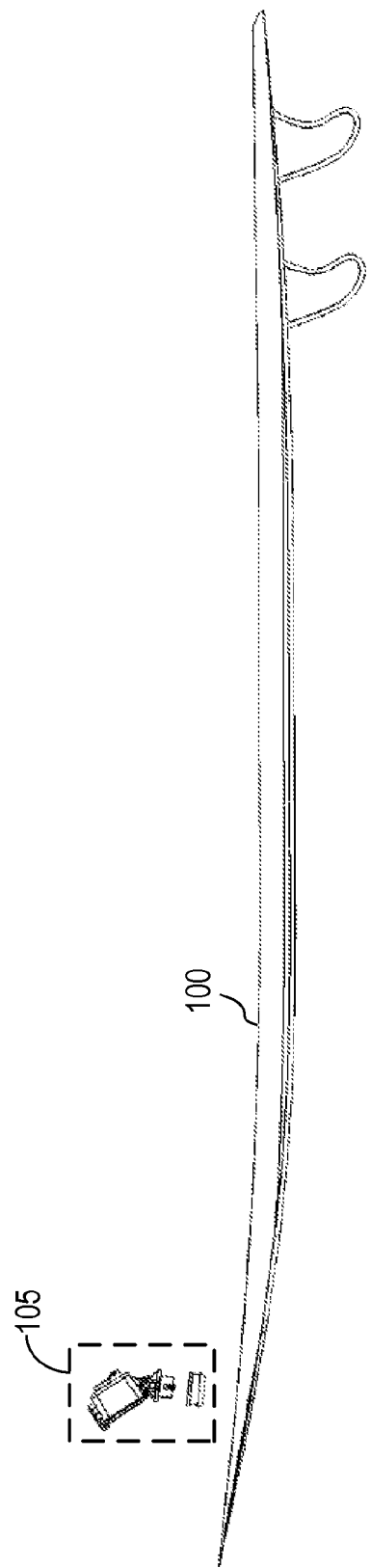
FIG. 4c illustrates one embodiment of a distant lateral view of a camera mount unattached from the front of a surfboard with the camera mount facing backwards, and with the surfboard attachment device removed from the front of the surfboard.

FIGS. 4a-c illustrate various views of a mount 105 that show the embedded plug 150 removed from the surfboard 100. In one embodiment, the embedded plug 150 is circular in shape and fits snugly into a circular shaped hole 165 cut out from the top of the surfboard 100 so that the top of the embedded plug 150 is substantially aligned with the surface of the surfboard 100. In one embodiment, the embedded plug 150 is configured to be fixed to the surfboard 100 in a substantially permanent manner once it is in place and is not intended to be removed.

In another embodiment, a different type of embedded plug 150 is used. For example, in one embodiment the embedded plug 150 comprises a slot having a width of similar size to protrusion 140 of the lower mount component 110 but longer in length. In this embodiment, the protrusion 140 of the lower mount component 110 includes a dowel that slides into an inner track inside the slot of the embedded plug 150. The mount 105 can then slide back and forth along the track to a desired position. The mount 105 can then be secured in the desired position using, for example, a plate and bolt assembly, or any other type of securing mechanism.

In additional alternative embodiments, the camera mount 105 can be mounted to a different type of sports board other than a surfboard. For example, the camera mount 105 may be attached to a wakeboard, a wind surfboard, a kite board, a paddle board, skateboard, snowboard, skis or other any other type of sports board. Thus, the described mount allows a user to securely mount a camera to a sports board to capture images and/or video during activity involving that board without taking away from the user's ability to surf or participate in other similar activities. Beneficially, the mount can be easily attached to a surfboard or other sports board in a variety of positions and angles to allow for the capture of images (still and/or video) of a person on the board.

While the above description contains many specificities, these should not be construed as limitations on the scope, but rather as an exemplification of preferred embodiments thereof. Accordingly, the scope of the disclosure should be determined not by the embodiment(s) illustrated, but by the appended claims and their legal equivalents.

What is claimed is:

1. A mounting system for attaching a camera to a sports board, comprising:
   an upper mount component structured to enclose a camera, the upper mount component having a bottom surface including a first plurality of protrusions extending from the bottom surface, each of the first plurality of protrusions having a pinhole;
   a lower mount component having a top surface and a bottom surface, the top surface including a second plurality of protrusions extending from the top surface, each of the second plurality of protrusions having a pinhole, wherein the second plurality of protrusions interlock with the first plurality of protrusions such that the pinholes in the first and second plurality of protrusions align for insertion of a pin, the bottom surface including a securing protrusion extending from the bottom surface, the securing protrusion structured for insertion into a reciprocal opening in an adhesive attachment;
   the pin inserted into the aligned first set of pinholes and second set of pinholes, coupling the upper mount component to the lower mount component; and
   the adhesive attachment having a body structured to adhesively attach to the top surface of the sports board and having a hole structured to receive a securing device which, when inserted into the hole of the adhesive attachment, secures the camera mounting system to the sports board.

2. The mounting system of claim 1, wherein a remainder of the lower mount component's bottom surface is structured to be substantially flush with a top surface of the adhesive attachment when the securing protrusion of the bottom surface is inserted within the opening of the adhesive attachment to at least a depth of at least the same length as a length of the securing protrusion of the bottom surface.

3. The mounting system of claim 1, wherein the upper mount component securely encloses a camera configured to record either images or video footage.

4. The mounting system of claim 1, wherein the upper mount component and lower mount component are rotatable about the pin when the pin is in a first position and the upper mount component and lower mount component are secured at a fixed angle when the pin is in a second secured position.

5. The mounting system of claim 4, wherein the pin comprises a turnable screw, wherein the pin is in the first position when the screw is loosened, and wherein the pin is in the second position when the screw is tightened.

6. The mounting system of claim 1, wherein the upper mount component comprises:
   a camera housing including a front face, a top face, a bottom face, a left side face, a right side face, and a back door, the faces and the door structured to enclose the camera when the door is in a closed position;
   an hinge structure pivotally coupling a bottom edge of the housing and the back door of the housing;
   a first fastening structure located on the top face of the camera housing;
   a second fastening structure located on a top edge of the back door, the second fastening structure for detachably coupling to the first fastening structure such that the back door of the camera housing is secured to the housing in the closed position when the first fastening structure is coupled to the second fastening structure, and wherein the camera is removable from the housing when the first fastening structure is unsecured from the second fastening structure.

7. The mounting system of claim 6, wherein the camera housing comprises a waterproof seal such that the housing is waterproof when the back door is secured in the closed position.

8. The mounting system of claim 1, wherein the adhesive attachment is structured to adhesively attach on the rear of the top surface of the sports board.

9. The mounting system of claim 1, wherein the adhesive attachment is structured to adhesively attach on the front of the top surface of the sports board.

10. The mounting system of claim 1, wherein the mounting system can be configured to face forwards or backwards.

11. A mounting system for attaching a camera to a sports board, comprising:
    an upper mount component structured to enclose a camera, the upper mount component having a bottom surface including a first plurality of protrusions extending from the bottom surface, each of the first plurality of protrusions having a pinhole;
    a lower mount component having a top surface and a bottom surface, the top surface including a second plurality of protrusions extending from the top surface, each of the second plurality of protrusions having a pinhole, wherein the second plurality of protrusions interlock with the first plurality of protrusions such that the pinholes in the first and second plurality of protrusions align for insertion of a pin, the bottom surface structured for attaching to the sports board using an adhesive attachment;
    the pin inserted into the aligned first set of pinholes and second set of pinholes, coupling the upper mount component to the lower mount component; and
    the adhesive attachment adhesively fixed to the top surface of the surfboard.

12. The mounting system of claim 11, wherein the upper mount component and lower mount component are rotatable about the pin when the pin is in a first position and the upper mount component and lower mount component are secured at a fixed angle when the pin is in a second secured position.

13. The mounting system of claim 12, wherein the pin comprises a turnable screw, wherein the pin is in the first position when the screw is loosened, and wherein the pin is in the second position when the screw is tightened.

14. The mounting system of claim 11, wherein the upper mount component comprises:
  a camera housing including a front face, a top face, a bottom face, a left side face, a right side face, and a back door, the faces and the door structured to enclose the camera when the door is in a closed position;
  an hinge structure pivotally coupling a bottom edge of the housing and the back door of the housing;
  a first fastening structure located on the top face of the camera housing;
  a second fastening structure located on a top edge of the back door, the second fastening structure for detachably coupling to the first fastening structure such that the back door of the camera housing is secured to the housing in the closed position when the first fastening structure is coupled to the second fastening structure, and wherein the camera is removable from the housing when the first fastening structure is unsecured from the second fastening structure.

15. The mounting system of claim 11, wherein the camera housing comprises a waterproof seal such that the housing is waterproof when the back door is secured in the closed position.

16. A mounting system for attaching a camera to a sports board, comprising:
  an upper mount component structured to enclose a camera, the upper mount component having a bottom surface including a first plurality of protrusions extending from the bottom surface, each of the first plurality of protrusions having a pinhole;
  a lower mount component having a top surface, the top surface including a second plurality of protrusions extending from the top surface, each of the second plurality of protrusions having a pinhole, wherein the second plurality of protrusions interlock with the first plurality of protrusions such that the pinholes in the first and second plurality of protrusions align for insertion of a pin, the lower mount component structured to adhesively attach to the top surface of the sports board; and
  the pin inserted into the aligned first set of pinholes and second set of pinholes, coupling the upper mount component to the lower mount component.

17. The mounting system of claim 16, wherein the upper mount component and lower mount component are rotatable about the pin when the pin is in a first position and the upper mount component and lower mount component are secured at a fixed angle when the pin is in a second secured position.

18. The mounting system of claim 17, wherein the pin comprises a turnable screw, wherein the pin is in the first position when the screw is loosened, and wherein the pin is in the second position when the screw is tightened.

19. The mounting system of claim 16, wherein the upper mount component comprises:
  a camera housing including a front face, a top face, a bottom face, a left side face, a right side face, and a back door, the faces and the door structured to enclose the camera when the door is in a closed position;
  an hinge structure pivotally coupling a bottom edge of the housing and the back door of the housing;
  a first fastening structure located on the top face of the camera housing;
  a second fastening structure located on a top edge of the back door, the second fastening structure for detachably coupling to the first fastening structure such that the back door of the camera housing is secured to the housing in the closed position when the first fastening structure is coupled to the second fastening structure, and wherein the camera is removable from the housing when the first fastening structure is unsecured from the second fastening structure.

20. The mounting system of claim 16, wherein the camera housing comprises a waterproof seal such that the housing is waterproof when the back door is secured in the closed position.

21. A mounting system for attaching a camera to a sports board, comprising:
  an upper mount component structured to enclose a camera, the upper mount component having a bottom surface including a first plurality of protrusions extending from the bottom surface, each of the first plurality of protrusions having a pinhole;
  a lower mount component having a top surface, the top surface including a second plurality of protrusions extending from the top surface, each of the second plurality of protrusions having a pinhole, wherein the second plurality of protrusions interlock with the first plurality of protrusions such that the pinholes in the first and second plurality of protrusions align for insertion of a pin;
  the pin inserted into the aligned first set of pinholes and second set of pinholes, coupling the upper mount component to the lower mount component; and
  attachment means for attaching the lower mount component to a top surface of the sports board.

* * * * *